(12) United States Patent
Hagiwara

(10) Patent No.: US 6,991,210 B2
(45) Date of Patent: Jan. 31, 2006

(54) ACTUATOR FOR DRIVING A VALVE

(75) Inventor: Hideo Hagiwara, Higashi-osaka (JP)

(73) Assignee: Tomoe Technical Research Company Ltd., Osaka (JP)

( * ) Notice: Subject to any disclaimer, the term of this patent is extended or adjusted under 35 U.S.C. 154(b) by 79 days.

(21) Appl. No.: 10/482,561

(22) PCT Filed: May 23, 2003

(86) PCT No.: PCT/JP03/06496

§ 371 (c)(1),
(2), (4) Date: Dec. 29, 2003

(87) PCT Pub. No.: WO2004/055389

PCT Pub. Date: Jul. 1, 2004

(65) Prior Publication Data

US 2005/0127312 A1    Jun. 16, 2005

(30) Foreign Application Priority Data

Dec. 16, 2002 (JP) .............................. 2002-363447

(51) Int. Cl.
*F16K 31/12* (2006.01)
(52) U.S. Cl. ......................................... 251/31; 92/164
(58) Field of Classification Search ................ 251/31, 251/62; 91/329; 92/138, 163, 164
See application file for complete search history.

(56) References Cited

U.S. PATENT DOCUMENTS 3,189,700 A * 6/1965 Eidson ..................... 200/61.86
3,452,961 A * 7/1969 Forsman ....................... 251/31
4,094,231 A * 6/1978 Carr ............................. 92/128
5,123,334 A * 6/1992 van Loo ...................... 92/138

FOREIGN PATENT DOCUMENTS

| JP | 46-33656 A1 | 10/1971 |
|---|---|---|
| JP | 49-8671 A1 | 1/1974 |
| JP | 55-102405 A1 | 7/1980 |
| JP | 62-114201 A1 | 7/1987 |

(Continued)

OTHER PUBLICATIONS

Patent Abstracts of Japan for JP49-8671 published on Jan. 25, 1974.

(Continued)

*Primary Examiner*—Edward K. Look
*Assistant Examiner*—John K. Fristoe, Jr.
(74) *Attorney, Agent, or Firm*—Darby & Darby

(57) ABSTRACT

The purpose of this invention is to provide an actuator for valve driving without enlarging its size, without increasing the cost, and without reducing the pressure receiving area of the pistons. In order to achieve the purpose, the present invention comprises the left and right side cylinders supporting each of the piston to slide freely towards the center of the piston rod, and the first passageway that communicates the left side cylinder room of the left side cylinder with the left side cylinder room of the right side cylinder where both cylinders are separated by the pistons, and the second passageway that communicates the right side cylinder room of the left side cylinder with the right side cylinder room of the right side cylinder where both cylinders are separated by the pistons, and the converter that converts the piston rod's reciprocating motion towards the center of the rod into the rotating motion of the valve driving shaft, and thereby being characterized by having the first and second passageways in or around the supporting members of the left and right side cylinders.

11 Claims, 6 Drawing Sheets

FOREIGN PATENT DOCUMENTS

| | | |
|---|---|---|
| JP | 01-91079 A1 | 6/1989 |
| JP | 02-107804 A1 | 8/1990 |
| JP | 06-73405 A1 | 10/1994 |

OTHER PUBLICATIONS

Patent Abstracts of Japan for JP62-114201 published on Jul. 21, 1987.

Patent Abstracts of Japan for JP01-91079 published on Jun. 15, 1989.

Patent Abstracts of Japan for JP55-102405 published on Jul. 17, 1980.

Patent Abstracts of Japan for JP46-33656 published on Oct. 2, 1971.

Patent Abstracts of Japan for JP06-73405 published on Oct. 18, 1994.

Patent Abstracts of Japan for JP02-107804 published on Aug. 28, 1990.

* cited by examiner

ACTUATOR FOR DRIVING A VALVE

This is a U.S. national phase application under 35 U.S.C. § 371 of International Patent Application No. PCT/JP03/06496 filed May 23, 2003, and claims the benefit of Japanese Patent Application No. 2002-363447 filed Dec. 16, 2002.

BACKGROUND OF THE INVENTION

1. Field of the Invention

The present invention is related to an actuator for driving valves such as butterfly valves and boll valves, which convert a reciprocating motion of pistons into a rotating motion, which then transmits the motion to the valve driving shaft. In particular, the invention is related to an actuator for driving valves that includes two of the aforesaid pistons and drives each piston in the direction of a shaft center by pressing with fluid pressure supplied into cylinder rooms provided at both sides of the pistons.

2. Description of the Related Art

As shown in FIG. 1, in a conventional rotary actuator R0 for butterfly valve driving, a four-port switching valve 104 intervenes between a pressure source 101 such as pumps, a tank 102 and a rotary actuator 103. In this condition, the working fluid, such as pressure oil or pressure air that is discharged from a pressure source 101, goes into a left side cylinder room 106 of a left side cylinder 109 via a flow control valve 105, and a portion of the working fluid goes into a left side cylinder room 108 of a right side cylinder 110 via a pipe 107, and thereby pressing pistons 111 and 112 intruded into the cylinders 109 and 110 in the direction of an arrow X. This sliding movement of the pistons 111 and 112 releases the fluid discharged from cylinder rooms 113 and 114 into the tank 102 from the four-port switching valve 104 via a flow control valve 115.

In order to move the piston in the reverse direction, the four-port switching valve 104 needs to be switched in the direction of arrow Y. According to this switching of the fluid path, the pistons 111 and 112 and a piston rod 116 that connects the both pistons, perform reciprocating motion as a unit.

In the meantime, a trunnion pin 118, which is implanted in a trunnion 117 fittingly fixed to the piston rod 116, is inserted into a yoke groove 122 of a yoke 121 fixed on a valve driving shaft 120 that is rotatably placed on a cylinder body 119, and when the pistons 111 and 112 perform the reciprocating motion, thereby sliding on the yoke groove 122 as pushing its side walls. Accordingly, the yoke 121 swings, and the butterfly valve connected to the valve driving shaft 120 rotates.

The foregoing mechanism that converts the reciprocating motion into the rotating motion by means of yokes is called "scotch yoke mechanism", and the yoke 121 equipped with the trunnion pin 118 and the yoke groove 122 is an example of the converters.

The above-described rotary actuator R0 for valve driving is disclosed in Japanese Utility Models Publications No. S63-32961 and H06-73405.

The above-mentioned conventional rotary actuator R0, which uses two pistons for rotating one valve driving shaft 120, has a benefit of obtaining larger driving forth compared with the conventional invention that uses only one piston disclosed in Japanese Patent Publication No. 2000-104706.

However, for example, the conventional actuator for valve driving disclosed in Japanese Utility Model Publication No. S63-32961 distributes the pressure fluid from one cylinder room to the other cylinder room by using such as external piping 107, thereby causing not only the enlargement of the actuator itself but also the increased material cost occurred from the additional piping.

Also, in the case of Japanese Utility Model Publication No. H06-73405, although the actuator is not enlarged since the piping of compressed air is formed inside of the rod corresponding to the above-mentioned piston rod 116, it does not still form a preferable structure since the hollow piston rod that contains the piping inside degrades the strength that the piston rod requires.

Naturally, although the above problem will be solved if the size of the piston rod is enlarged, it causes another problems of reducing the pressure receiving area of the piston, or enlarging the actuator in an attempt to secure sufficient pressure receiving area.

Therefore, the purpose of the present invention is to provide an actuator for valve driving, which comprises a piping structure between cylinders without enlarging its size, without increasing the cost, and without reducing the pressure receiving area of the pistons.

SUMMARY OF THE INVENTION

In order to achieve the above-mentioned purpose, the present invention comprises:

the piston rod fixed with pistons at both left and right ends;

the left and right side cylinders supporting each of the above piston to slide freely towards the center of the piston rod;

the first passageway that communicates the left side cylinder room of the left side cylinder with the left side cylinder room of the right side cylinder where both cylinders are separated by the pistons;

the second passageway that communicates the right side cylinder room of the left side cylinder with the right side cylinder room of the right side cylinder where both cylinders are separated by the pistons; and the converter that converts the piston rod's reciprocating motion towards the center of the rod into the rotating motion of the valve driving shaft, and thereby being characterized by having the first and second passageways in or around the supporting members of the left and right side cylinders.

The words "left side" and "right side" are used as having relative means, not absolute means.

Also, as an example of the said supporting member, the supporting bolts that connect the left side wall of the left side cylinder room and the right side wall of the right side cylinder room to the main body of the actuator can be used.

The above and other objects, features, and advantages of the present invention will become apparent from the following description read in conjunction with the accompanying drawings, in which like reference numerals designate the same elements.

DETAILED DESCRIPTION OF THE PREFERRED EMBODIMENTS

Figure 2:
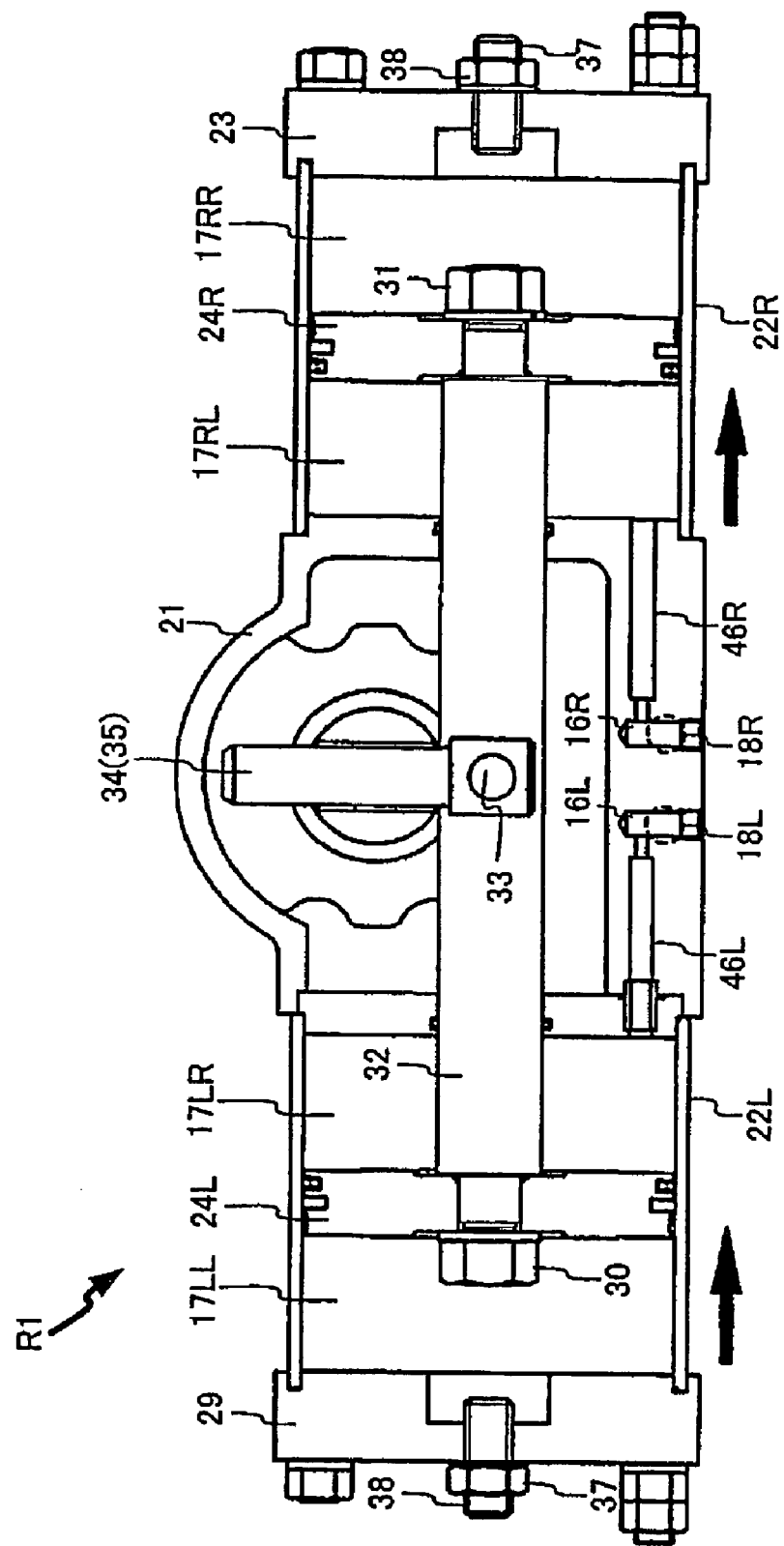
FIG. 2 is a sectional side view of an actuator for valve driving according to an embodiment of the present invention.
Figure 3:
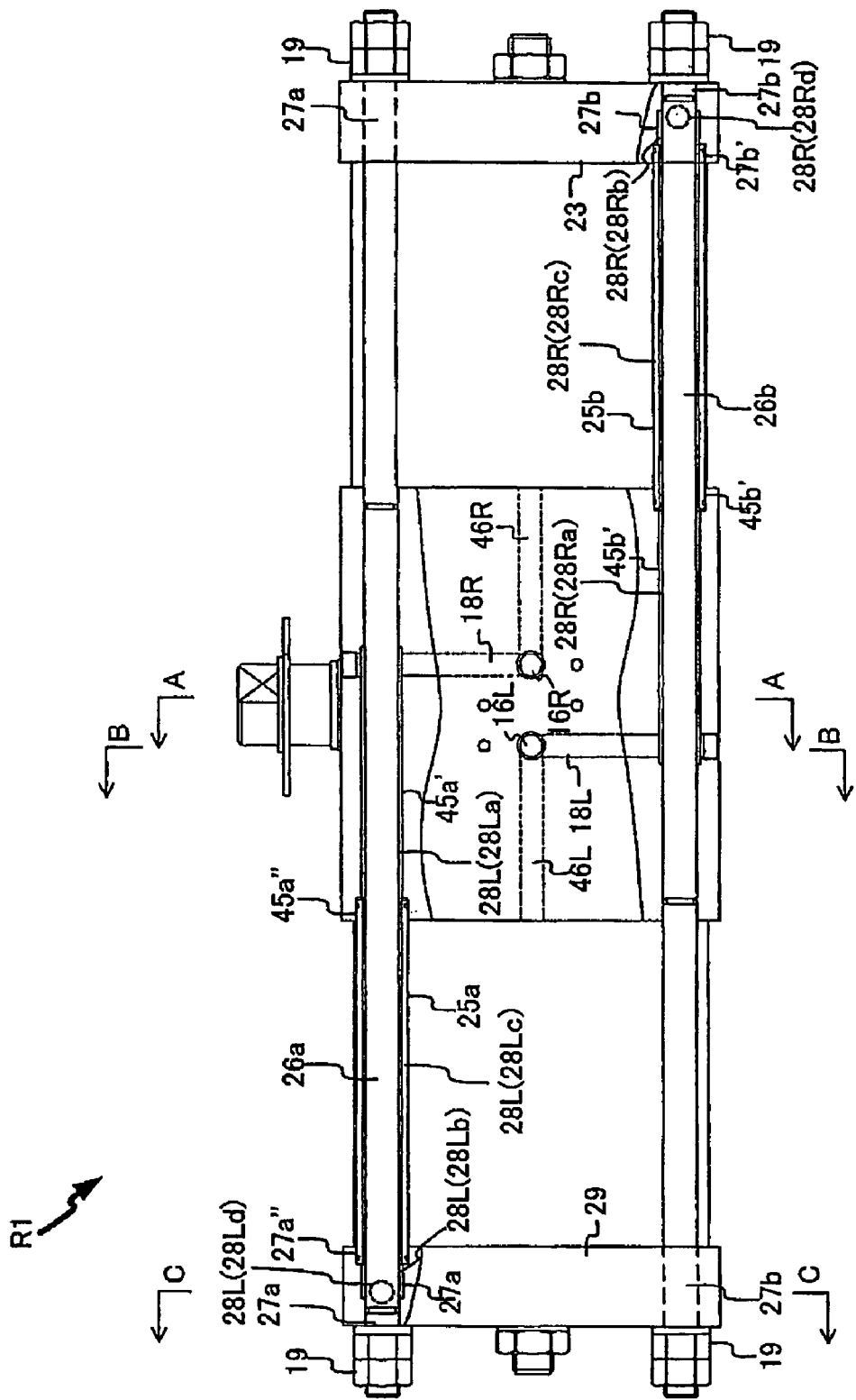
FIG. 3 is a top view of the actuator in FIG. 2, partially cross-sectional.
Figure 4:
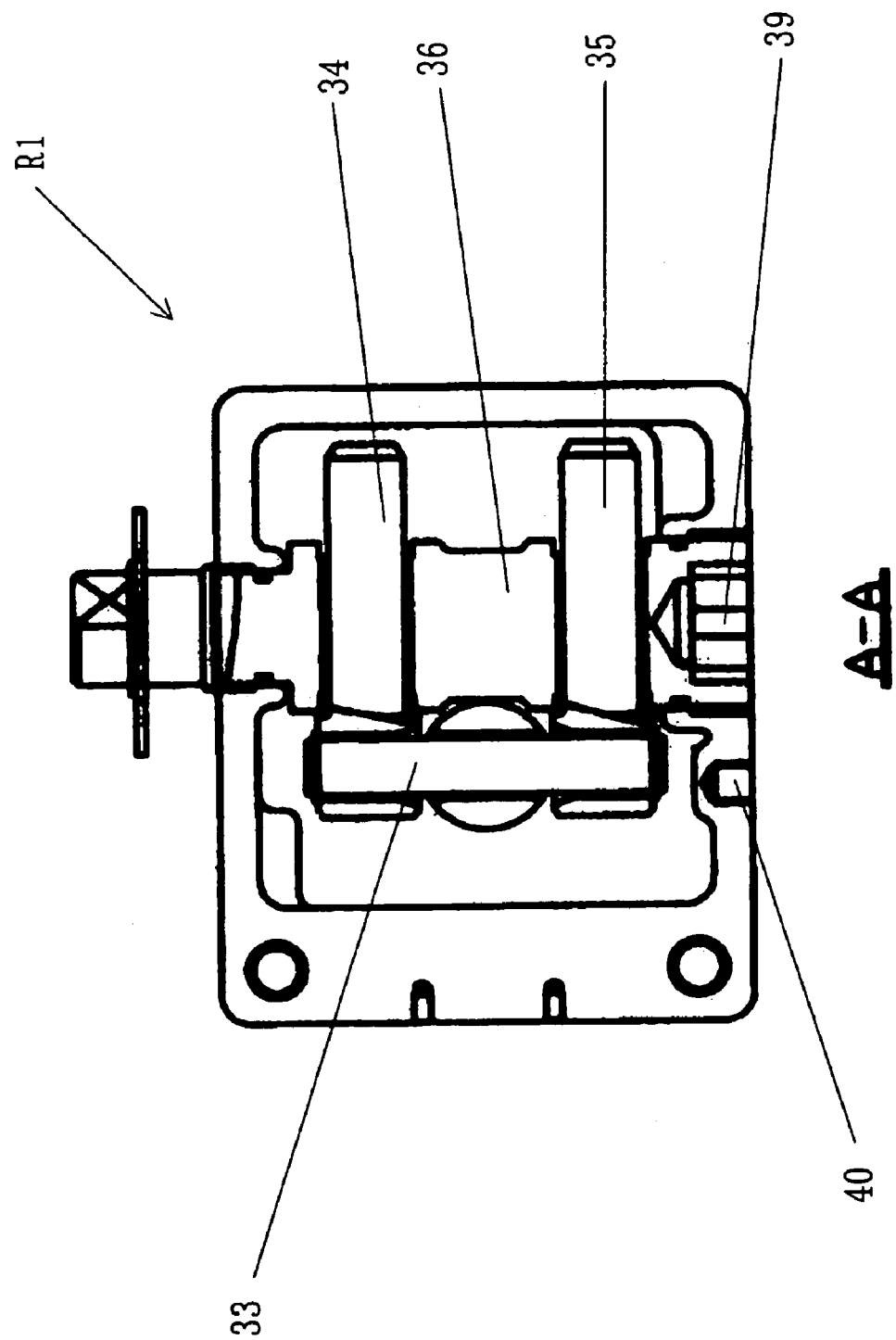
FIG. 4 is a cross-sectional view taken along the line A—A of FIG. 3.

Referring now to the rotary actuator R1 related to the embodiments shown in FIG. 2 to FIG. 4, the present invention is the same as the conventional rotary actuator on the point of comprising:

the converter equipped with the piston rod 32 fixing the piston 24L and 24R on the both ends, the left side cylinder 22L and the right side cylinder 22R that support the said each piston 24L and 24R to slide freely towards the center of the piston rod 32;

the left side passageway (the first passageway) that communicates the left side cylinder room 17LL of the left side cylinder 22L with the left side cylinder room 17RL of the right side cylinder 22R where both cylinders are separated by the piston 24L;

the right side passageway (the second passageway) the communicates the right side cylinder room 17LR of the left side cylinder 22L with the right side cylinder room 17RR of the right side cylinder 22R where both cylinders are separated by the piston 24L; and the converter comprising the yokes 34 and 35, the pin 33 and the like in order to convert the piston rod 32's reciprocating motion toward the center of the rod into rotating motion of the valve driving shaft 36 (FIG. 4).

However, the present invention is fundamentally different from the conventional rotary actuator R0 on the point that the said left side passageway (the first passageway) and the right side passageway (the second passageway) are equipped as 28L and 28R around the tie-rod 26a and 26b that are the supporting members to connect the right and left side cylinders 22R and 22L to the center body 21 as the main body of the actuator. More detail is described as below. Additionally, the tie-rod is also an example of the supporting bolts.

The rotary actuator R1 comprises the center body 21 as the structural center that rotatably supports the said valve driving shaft 36 to drive butterfly valves or ball valves. The right side cylinder 22R and the left side cylinder 22L are connected to each side of the center body 21 respectively. The left side opening of the left side cylinder 22L and the right side opening of the right side cylinder 22R are tightly sealed with the cover 29 and 23 respectively.

Also, the piston rod 32 is supported so as to slide freely in the horizontal direction on the center body 21. Inserted into the left and right cylinders 22L and 22R are the both left and right ends of the piston rod 32, on which the left side piston 24L and the right side piston 24R are fixed with the nuts 30 and 31 respectively so as to freely slide inside of the each cylinders 22L and 22R respectively.

Therefore, the internal cylinder room of the left side cylinder 22L sealed with the center body 21 and left side cover 29 on both ends is divided into the left side cylinder room 17LL and the right side cylinder room 17LR by the left side piston 24L. Also, the internal cylinder room of the right side cylinder 22R sealed with the center body 21 and right side cover 23 on both ends is divided into the left side cylinder room 17RL and the right side cylinder room 17RR by the right side piston 24R.

As shown in FIG. 3, the first tie-rod 26a passes through the through-holes 27a formed in the covers 23 and 29, and the second tie-rod 26b passes through the through-holes 27b formed on the said covers, and by screwing the nut 19 at the thread part formed on each end of 26a and 26b, the cylinders 22L and 22R are clinched and held between the center body 21 and the covers 23 and 29. Accordingly, the tie-rods 26a and 26b are the example of the supporting members of the cylinders 22R and 22L.

The pin 33 illustrated in FIG. 2 and FIG. 4 is rotatably placed on the center of the piston rod 32. As shown in FIG. 4, the pin 33 is rotatably adapted to engage with the ends of the yokes 34 and 35, which are perpendicularly placed to slide freely on the valve driving shaft 36 placed rotatably on the center body 21. The pin 33, the yoke 34 and the yoke 35 are the examples of the converters.

Figure 1:
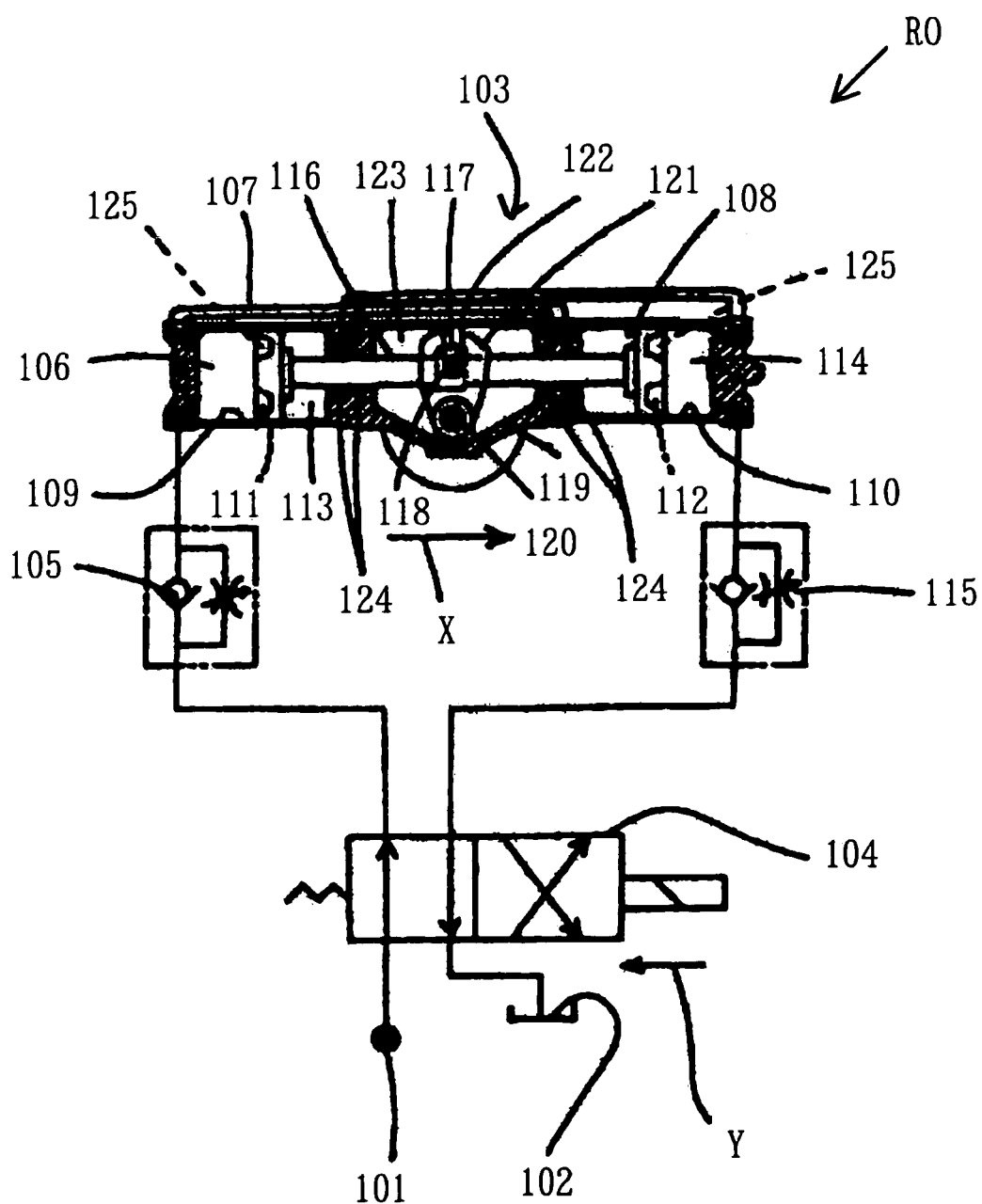
FIG. 1 is a schematic diagram showing the air-circuit of a conventional actuator for valve driving.

In addition, the air supply inlet 16R supplying the air as working fluid via the air channel 46R and the air supply inlet 16L supplying the air as working fluid via the air channel 46L are formed in the center body 21. The air supply inlets 16R and 16L are connected to the pressure source 101 via the flow control valves 105 and 115 shown in FIG. 1.

Figure 5:
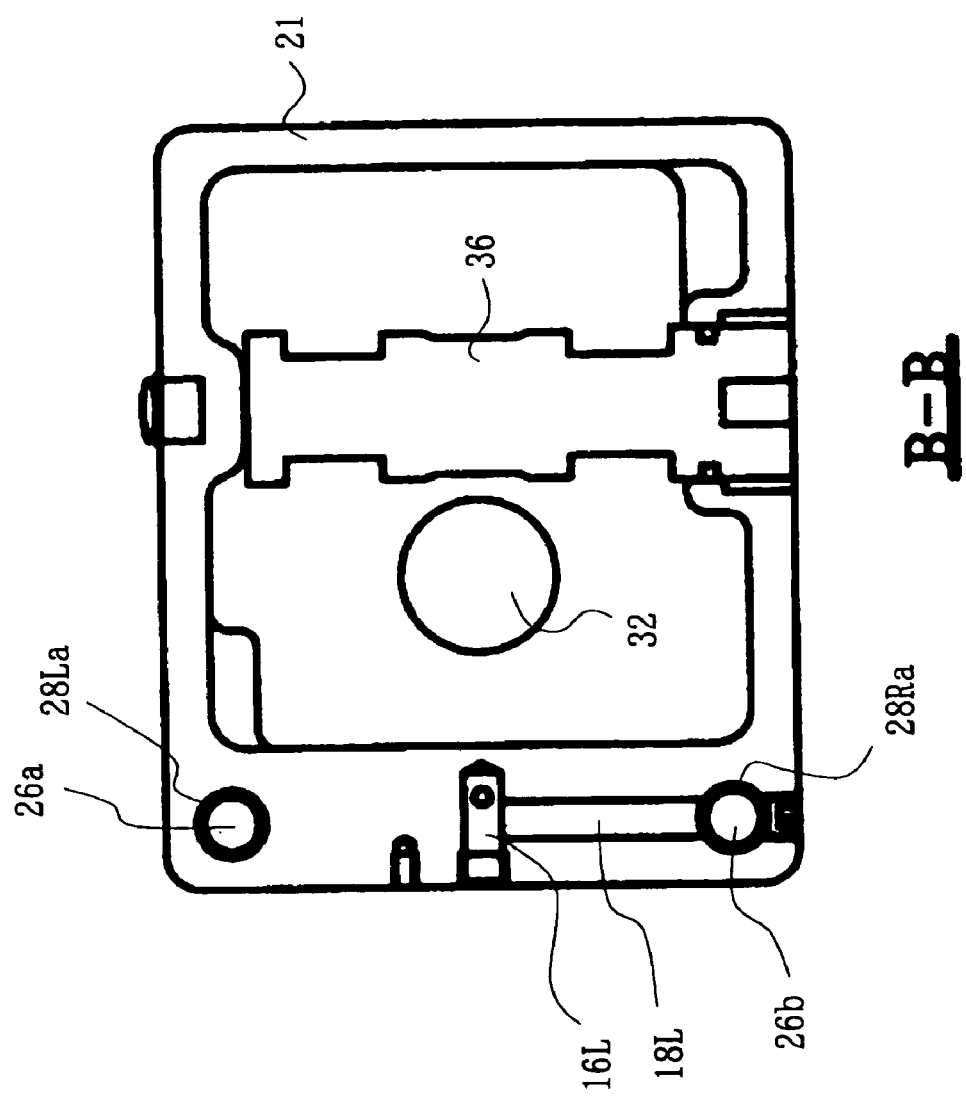
FIG. 5 is a cross-sectional view taken along the line B—B of FIG. 3.

Additionally, the left side passageway 28L is connected to the air supply inlet 16R via the air channel 18R illustrated in FIG. 3, and the right hand passageway 28R is connected to the air supply inlet 16L via the air channel 18L illustrated in FIG. 5. The figure of the air channel 18R is omitted since it is describable in the diphycercal figure of FIG. 5 indicating the air channel 18L.

Figure 6:
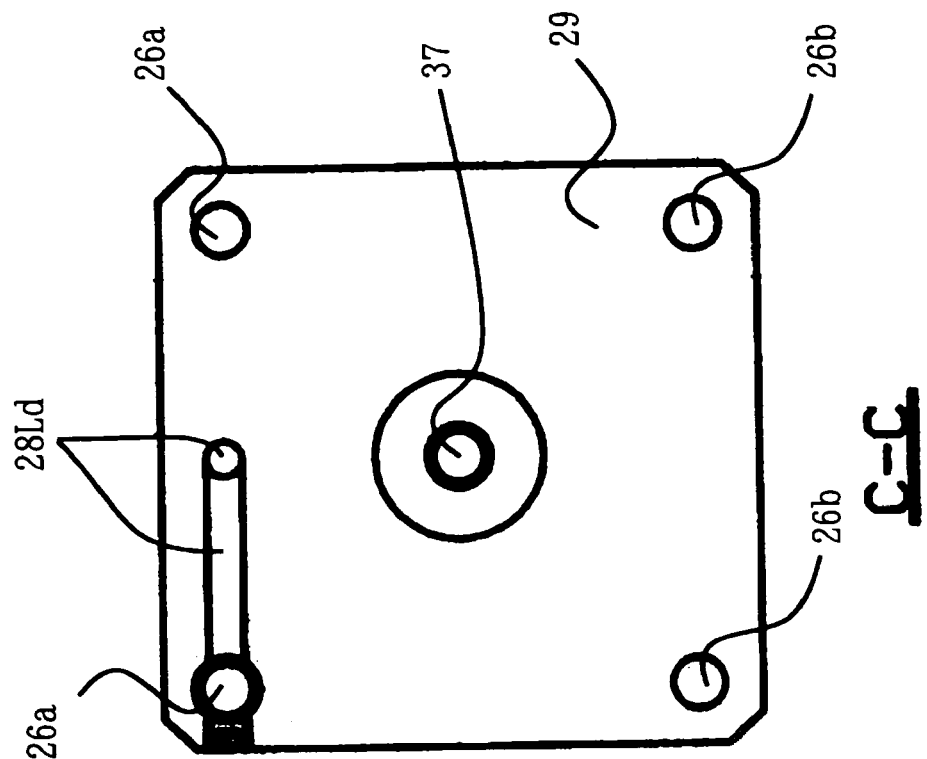
FIG. 6 is a cross-sectional view taken along the line C—C of FIG. 3.

The passageways 28L and 28R comprise in the communicating condition:

the air channels 28La and 28Ra formed from the interspaces between the tie-rods 26a and 26b, and the medium diameters 45a' and 45b' of the through-holes 45a and 45b having the tie-rods 26a and 26b bored through the center body 21;

the air channels 28Lb and 28Rb formed from the interspaces between the tie-rods 26a and 26b, and the medium diameters 27a' and 27b' of the through-holes 27a and 27b having the tie-rods 26a and 26b bored through the covers 29 and 23;

the air channels 28Rc and 28Lc formed from the interspaces between the tie-rods 26a and 26b, and the hollow pipes 25a and 25b, which internally bore the tie-rods 26a and 26b having the one end inserted into the large diameters 45a" and 45b" that have the same shaft of the medium diameters 45a' and 45b' of the center body 21, and the other end inserted into the large diameters 27a" and 27b" that have the same shaft of the medium diameters 27a' and 27b' in the covers 23 and 29; and the air channels 28Ld and 28Rd connecting the air channels 28Lb and 28Rb formed in the covers 29 and 23 respectively with the cylinder rooms 17LL and 17RR (see FIG. 6).

Here, the figure of the air channel 28Rd is also omitted since 28Rd is describable in the symmetrical figure of FIG. 6 indicating the air channel 28Ld.

Therefore, explained below is the flow of the compressed air in the case of rotating the valve driving shaft 36 anticlockwise by moving piston 32 to the right direction as indicated with the arrow in FIG. 2 then rotating the yokes 34 and 35 anticlockwise in FIG. 5.

In this case, the compressed air from the pressure source 101(FIG. 1) is supplied from the air supply inlet 16R into the left side cylinder room 17RL of the right side cylinder 22R via the air channel 46R. Accordingly, the right side piston 24 R is pushed in the direction of the arrow.

Also, the compressed air supplied into the air supply inlet 16R is then supplied into the left side cylinder room 17LL inside of the left side cylinder 22L sequentially passing through the air channels 28La, 28Lc, 28Lb and 28Ld via the air channel 18R connected to the air supply inlet 16R. Therefore, the left side piston 24L is pushed in the direction of the arrow.

The air pushed out from the cylinder room 17LR by the movement of the pistons 24L and 24R in the direction of the arrow is discharged into the air supply inlet 16L via the air channel 46L. Also, the air pushed out from the cylinder room 17RR is discharged into the air supply inlet 16L through the air channels 28Rd, 28Rb, 28Rc, 28Ra and 18L.

According to the foregoing structure, this embodiment provides the rotary actuator obtaining large driving forth since the piston rod 32 for driving the valve driving shaft 36 is pushed by the pistons 24L and 24R.

On the contrary, when driving the valve driving shaft 36 in clockwise direction in FIG. 2 by rotating the piston rod 32 in the opposite direction of the arrow, the compressed air from the pressure source 101 (FIG. 1) is supplied into the right side cylinder room 17LR of the left side cylinder 22L via the air channel 46L from the air supply inlet 16L. Accordingly, the left side piston 24L is pushed in the opposite direction of the arrow.

Also, the compressed air supplied into the air supply inlet 16L is supplied into the right side cylinder room 17RR of the right side cylinder 22R sequentially passing through the air channels 28Ra, 28Rc, 28Rb and 28Rd via the air channel 18L. Accordingly, the right side piston 24R is pushed in the opposite direction of the arrow.

Accompanying with the movement of the pistons 24L and 24R in the opposite direction of the arrow, the air pushed out from the cylinder room 17 RL is discharged into the air supply inlet 16R via the air channel 46R. Also, the air pushed out from the cylinder room 17LL is discharged into the air supply inlet 16R via the passageway 28L (28Ld, 28Lb, 28Lc, 28La) and 18R.

The piston rod 32, which is driven in the direction or in the opposite direction of the arrow, stops at the exact location by hitting its tip with the bolt 37, functioning as the stopper, fixed on the covers 23 or 29 with the nut 38.

The 39 is the valve lug-hole formed in the valve driving shaft 36. Also, the 40 is the lug-hole for fixing the actuator R1 to the main body of the valve.

In the above embodiment, as an example, the first and second passageways are formed around the tie-rods, however it is also possible to form the first and second passageways inside of the tie-rods or in the supporting members other than the tie-rods.

The present invention can be applied to actuators for driving various valves. For example, it can be applied to not only butterfly valves but also such as ball valves.

Having described in the above, the present invention comprises:

the piston rod fixed with pistons at both left and right ends;

the left and right side cylinders supporting each of the above piston to slide freely towards the center of the piston rod;

the first passageway that communicates the left side cylinder room of the left side cylinder with the left side cylinder room of the right side cylinder where both cylinders are separated by the pistons;

the second passageway that communicates the right side cylinder room of the left side cylinder with the right side cylinder room of the right side cylinder where both cylinders are separated by the pistons; and the converter that converts the piston rod's reciprocating motion towards the center of the rod into the rotating motion of the valve driving shaft, and thereby being characterized by having the first and second passageways in or around the supporting members of the left and right side cylinders.

Accordingly, the present invention can provide an inexpensive actuator for valve driving, avoiding the reduction of the strength of piston rods and the enlargement of the actuator, since the passageways are formed in/around the supporting members that support the cylinders originally required to any actuators for valve driving.

If the supporting bolt, as an example of the supporting members, is applied to connect the left side wall of the left side cylinder room and the right side wall of the right side cylinder room with the main body of the actuator, it is possible to drive the valves without changing the outer size of the actuator.

What is claimed is:

1. An actuator for driving a valve, comprising:
   a piston rod fixed with pistons at both left and right ends of the rod;
   left and right side cylinders supporting each of said pistons for the pistons to slide freely towards the center of said piston rod;
   a first passageway for communicating a left side cylinder room of the left side cylinder with a left side cylinder room of the right side cylinder where both cylinders are separated by said pistons;
   a second passageway for communicating a right side cylinder room of the left side cylinder with a right side cylinder room of the right side cylinder where both cylinders are separated by said pistons; and
   a converter for converting a reciprocating motion of said piston rod towards the center of said rod into a rotating motion of a valve driving shaft,
   wherein said first and second passageways are in or around connecting members of said left and right side cylinders.

2. An actuator for driving a valve according to claim 1, wherein said connecting members are supporting bolts for connecting a left side wall of said left side cylinder room and a right side wall of said right side cylinder room to a main body of said actuator.

3. An actuator for driving a valve, comprising:
   a valve driving shaft;
   a center body for rotatably supporting the valve driving shaft;
   right and left cylinders connected respectively to right and left sides of the center body;
   a pair of tie-rods as connecting members for respectively connecting the right and left cylinders to the center body;
   a first passageway provided around one of the tie-rods;
   a second passageway provided around the other tie-rod; and
   a pair of air supply inlets for supplying air, said inlets provided on the center body:
   wherein the first passageway is connected to one of the air supply inlets and the second passageway is connected to the other air supply inlet,
   wherein the left piston divides the left cylinder into left and right rooms and the right piston divides the right cylinder into left and right rooms, the first passageway provides the left room of the left cylinder to communicate with the left room of the right cylinder and the second passageway provides the right room of the left cylinder to communicate with the right room of the right cylinder.

4. An actuator for driving a valve, comprising:
a valve driving shaft;
a center body for rotatably supporting the valve driving shaft;
right and left cylinders connected respectively to right and left sides of the center body;
a pair of tie-rods as connecting members for respectively connecting the right and left cylinders to the center body;
a first passageway provided around one of the tie-rods;
a second passageway provided around the other tie-rod; and
a pair of air supply inlets for supplying air, said inlets provided on the center body;
wherein the first passageway is connected to one of the air supply inlets and the second passageway is connected to the other air supply inlet.

5. The actuator according to claim 4, further comprising:
a piston rod to slide freely on the center body, said piston rod having at its ends right and left pistons within the right and left cylinders, respectively,
wherein the right and left pistons are provided to slide freely inside the respective cylinders.

6. The actuator according to claim 4, further comprising:
a converter for converting a reciprocating motion of said piston rod towards the center of said rod into a rotating motion of the valve driving shaft.

7. The actuator according to claim 6, wherein the converter comprises:
yokes perpendicularly placed on the valve driving shaft;
a pin rotatably placed on a center of the piston rod, said pin rotatably adapted to engage with ends of the yokes.

8. An actuator for driving a valve, comprising:
a valve driving shaft;
a center body for rotatably supporting the valve driving shaft;
right and left cylinders connected respectively to right and left sides of the center body;
a pair of tie-rods as connecting members for respectively connecting the right and left cylinders to the center body;
a first passageway provided around one of the tie-rods; and
a second passageway provided around the other tie-rod,
wherein the left piston divides the left cylinder into left and right rooms and the right piston divides the right cylinder into left and right rooms, the first passageway provides the left room of the left cylinder to communicate with the left room of the right cylinder and the second passageway provides the right room of the left cylinder to communicate with the right room of the right cylinder.

9. The actuator according to claim 8, further comprising:
a piston rod to slide freely on the center body, said piston rod having at its ends right and left pistons within the right and left cylinders, respectively,
wherein the right and left pistons are provided to slide freely inside the respective cylinders.

10. The actuator according to claim 8, further comprising:
a converter for converting a reciprocating motion of said piston rod towards the center of said rod into a rotating motion of the valve driving shaft.

11. The actuator according to claim 10, wherein the converter comprises:
yokes perpendicularly placed on the valve driving shaft;
a pin rotatably placed on a center of the piston rod, said pin rotatably adapted to engage with ends of the yokes.

* * * * *